United States Patent
Gorghuber et al.

(10) Patent No.: US 10,522,273 B2
(45) Date of Patent: Dec. 31, 2019

(54) INSULATED JOYSTICK ASSEMBLY

(71) Applicant: Altec Industries, Inc., Birmingham, AL (US)

(72) Inventors: Steven J. Gorghuber, Duluth, MN (US); Mitchell D. Hesley, Duluth, MN (US)

(73) Assignee: Altec Industries, Inc., Birmingham, AL (US)

( * ) Notice: Subject to any disclaimer, the term of this patent is extended or adjusted under 35 U.S.C. 154(b) by 163 days.

(21) Appl. No.: 15/685,391

(22) Filed: Aug. 24, 2017

(65) Prior Publication Data

US 2019/0066884 A1 Feb. 28, 2019

(51) Int. Cl.
| | |
|---|---|
| *G05G 9/047* | (2006.01) |
| *H01B 17/64* | (2006.01) |
| *H01B 17/00* | (2006.01) |
| *B66F 11/04* | (2006.01) |
| *H02B 3/00* | (2006.01) |
| *G05G 1/06* | (2006.01) |
| *H02B 5/02* | (2006.01) |

(52) U.S. Cl.
CPC .......... *H01B 17/005* (2013.01); *B66F 11/046* (2013.01); *G05G 1/06* (2013.01); *H02B 3/00* (2013.01); *G05G 9/047* (2013.01); *G05G 9/04737* (2013.01); *H01B 17/64* (2013.01); *H02B 5/02* (2013.01)

(58) Field of Classification Search
CPC ........ G05G 9/04737; G05G 9/00; G05G 9/02; G05G 9/04; G05G 9/047; G05G 9/06; B66F 11/044; B66F 11/046; H01H 25/04; H01B 17/005

USPC ...................................... 74/471 XY; 182/141
See application file for complete search history.

(56) References Cited

U.S. PATENT DOCUMENTS 2,841,659 A * 7/1958 Eitel .................. G05G 9/04796
  200/5 R
3,056,867 A * 10/1962 Eitel ....................... F15B 13/06
  137/636

(Continued)

OTHER PUBLICATIONS

Force Joystick; DACO hand controllers; Date Printed: Nov. 7, 2017; Date Posted: Unknown; <http://www.daco.co.uk/modular-controllers/force-joysticks>.

*Primary Examiner* — Victor L MacArthur
*Assistant Examiner* — Gregory Robert Weber
(74) *Attorney, Agent, or Firm* — Erise IP, P.A.

(57) ABSTRACT

A joystick assembly is disclosed. In embodiments, the joystick controls a boom and aids in insulating a user from potential electric shock. Handle utilized by the operator may be made of, or at least one surface coated or covered in, material highly-resistant to electric current. The highly-resistant material may also extend to other components such as, a connecting rod, and a mounting base. The highly-resistant components may separate the operator from electrically charged components. As well as separating the operator from potentially electrically charged components, the rod may be received at the base by force measuring sensors, or strain measuring sensors may be attached to the rod. This allows the handle and rod to be stationary and, in embodiments, rigid, and only the applied force to be measured, thus decreasing the number of components needed in the assembly.

20 Claims, 7 Drawing Sheets

(56) References Cited

U.S. PATENT DOCUMENTS

| | | | | |
|---|---|---|---|---|
| 4,044,856 A * | 8/1977 | Stevenson | ............ | B66F 11/044 182/2.4 |
| 4,084,619 A * | 4/1978 | Johnson | ................ | B66F 11/044 137/636.2 |
| 4,113,054 A * | 9/1978 | Myers | .................. | B66F 11/044 182/2.9 |
| 4,762,199 A * | 8/1988 | Holmes | ................ | B66F 11/044 182/148 |
| 6,543,578 B1 * | 4/2003 | Merz | ...................... | B66C 13/56 182/148 |
| 7,275,616 B2 * | 10/2007 | Link | .................... | A01D 41/127 180/333 |
| 7,416,053 B2 * | 8/2008 | Chard | .................. | B66F 17/006 182/2.4 |
| 8,267,373 B2 * | 9/2012 | Pierson | .................. | G05G 1/04 251/105 |
| 8,505,406 B2 * | 8/2013 | Cowling | ................. | G05G 1/04 74/471 XY |
| 9,527,713 B2 * | 12/2016 | Freeman | ............. | B66F 11/044 |
| 2013/0313042 A1 * | 11/2013 | Freeman | ............. | B66F 11/044 182/19 |

* cited by examiner

INSULATED JOYSTICK ASSEMBLY

BACKGROUND

1. Field

Embodiments of the invention are broadly directed to electrical insulation of a user input device. More specifically embodiments of the invention relate to a joystick that may comprise electrically highly-resistant material providing layers of insulation between a machine operator and electrically energized machine components.

2. Related Art

Controlling the movement of a boom and a utility bucket is performed by an operator in the utility bucket using a single handle controller, or joystick. A boom truck performing utility work may be in danger of contacting electrified components thus electrifying the boom. When this occurs, the operator of the boom is in danger of electric shock. Boom covers, that may be dielectric, are commonly used to prevent boom components from coming in direct contact with energized conductors. However, these are not always reliable and they may become damaged, increasing the risk of electric shock. Levels of redundancy should be employed for safety purposes. It also may not be convenient to use boom covers and alternative insulation methods may be needed.

Other problems with joystick type controller systems are the amount of moving parts and the difficulty of operation for an operator. Complex moving parts cause reliability issues, wear on components, and high repair costs. The current controllers may require large actuations before the boom responds and may have high levels of deadband causing reduced feedback and accuracy when operating a boom.

What is needed is additional protection from potential electric shock such as, the use of insulating materials and separation of the operator from possible contact of energized components while reducing the number of components of the assembly.

SUMMARY

Embodiments of the invention solve these problems by providing layers of insulation between electronic components and an operator. A handle utilized by the operator may be formed of, or at least one surface coated or covered in, a highly-resistant material. A highly-resistant material is a material that is resistant to the flow of electricity, such as fiberglass, silicon, porcelain, glass, rubber, and non-conductive polymers. The highly-resistant material may also extend to other components such as a connecting rod and a mounting base. This may separate the operator from electrically charged components. As well as separating the operator the rod may be received at the base by force measuring sensors. This allows the handle and rod to remain stationary and only the applied force to be measured, thus decreasing the number of components needed in the assembly. By decreasing the number of components, the assembly may be more reliable and less expensive.

A first embodiment is directed to an insulating joystick assembly comprising a base, an insulating cover, a handle, a user input device, an exterior rod, an interior rod, and at least one sensor. When the user input device is actuated by an operator, the interior rod is actuated. A sensor is configured to sense the actuation of the interior rod. The exterior rod is attached to the handle and when the handle is moved by the operator the displacement is translated to an end of the rod that is housed in the base. A sensor in the base is configured to detect the displacement of the exterior rod and send a signal indicative of the displacement. The handle and the user input device comprise electrically highly-resistant materials on at least one surface.

A second embodiment is directed to an insulating joystick assembly comprising a base, an insulating cover, a handle, a user input device, an exterior rod, an interior rod, and sensors. As a result of the user input device being actuated by an operator the interior rod is actuated. A sensor is configured to sense the actuation of the interior rod. The exterior rod is attached to the handle and when the operator applies a force to the handle the force is translated to an end of the rod that is housed in the base. A sensor in the base is configured to detect the force applied to the handle and send a signal indicative of the force. The handle, the exterior rod, and the user input device comprise electrically highly-resistant materials on at least one surface.

A third embodiment is directed to a joystick assembly comprising a rod that is rigidly fixed to a joystick mount on one end. A sensor is attached to the rod end proximal the joystick mount. The rod end distal the joystick mount is configured for user input. The sensor is configured to detect a force applied at the distal end of the rod. The rod comprises an electrically highly-resistant material on at least one side.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF DRAWINGS

Embodiments of the invention are described in detail below with reference to the attached drawing figures, wherein.

Figure 1:
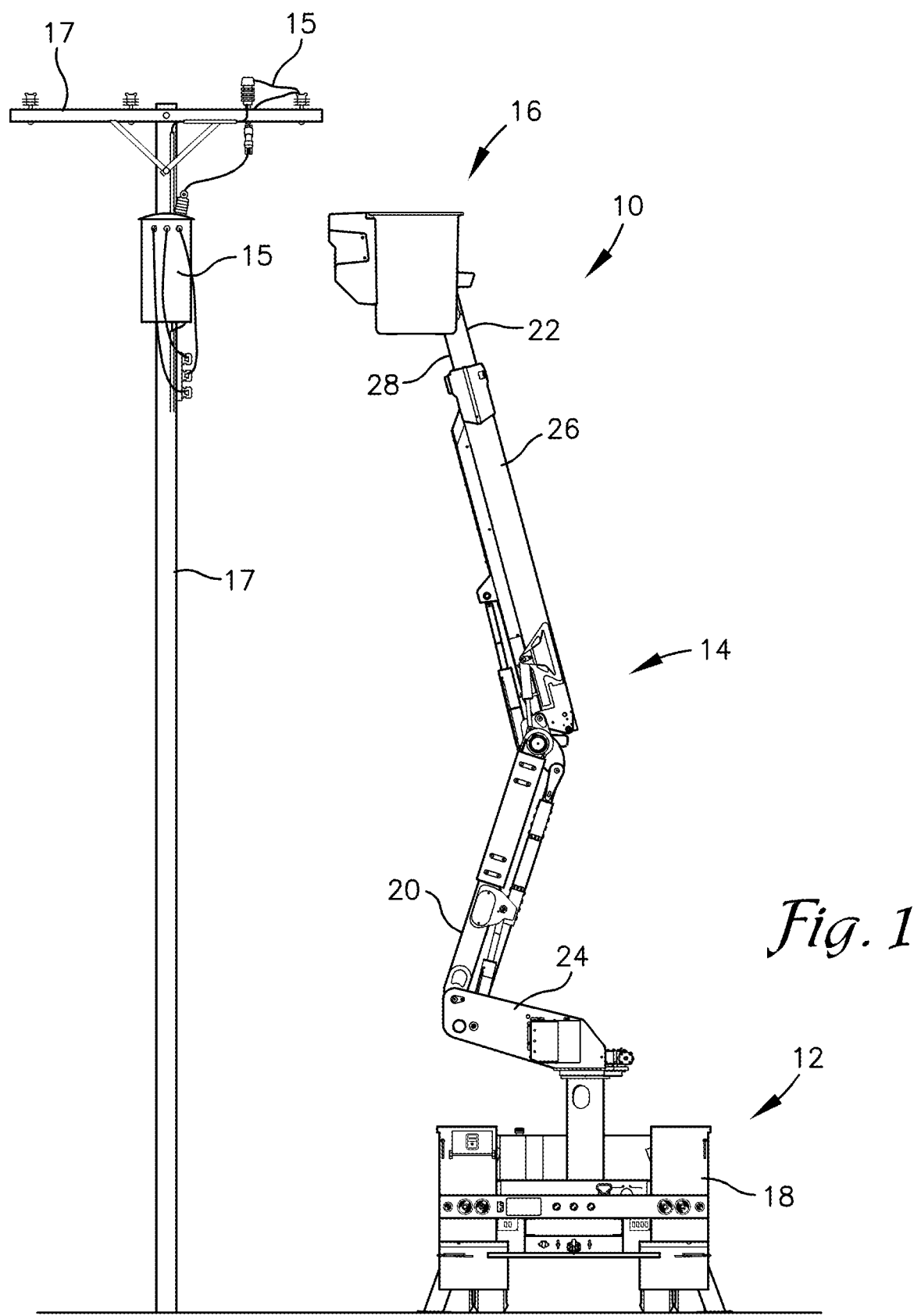
FIG. 1 depicts an exemplary embodiment of a utility truck, boom, and utility platform assembly.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

An aerial device 10, constructed in accordance with various embodiments of the invention, is shown in FIG. 1. The aerial device 10 generally comprises a structural base 12 with a boom assembly 14 rotatably mounted thereto. A utility platform assembly 16 is disposed on the boom assembly 14 to provide the aerial platform assembly 16 for the accomplishment of a task by a utility worker. In embodiments of the invention a joystick assembly may be disposed in the utility platform assembly 16 for controlling the boom assembly 14. The aerial device 10 may be controlled to allow a user access to an electrified source 15 and an obstacle 17 while preventing contact between the aerial device 10 and the electrified source 15 or obstacle 17.

The structural base 12 of the aerial device 10 is a selectively stabilized platform. In embodiments of the invention, the structural base 12 may be a utility truck 18 (as illustrated in FIG. 1), a crane base, an oilrig, an earth-working machine, or a fixed structure. The structural base 12 provides stability and a counterweight to a load being supported by the boom assembly 14. The structural base 12 also provides a hydraulic power system, pneumatic power system, electrical power system, or other system (not illustrated) that powers the movement of the utility platform assembly 16.

The boom assembly 14 broadly comprises an outer boom section 26 and at least one inner boom section 28. The boom assembly 14 presents a proximal end 20 and a distal end 22. The proximal end 20 is rotatably and/or pivotably secured to a boom turret 24 of the structural base 12. The at least one inner boom section 28 is at least in part disposed within the outer boom section 26 assembly. The at least one inner boom section 28 telescopes to extend or retract into the outer boom section 26 assembly. All boom operations as well as some structural base operations may be operated by controls disposed in the utility platform assembly 16.

Figure 2:
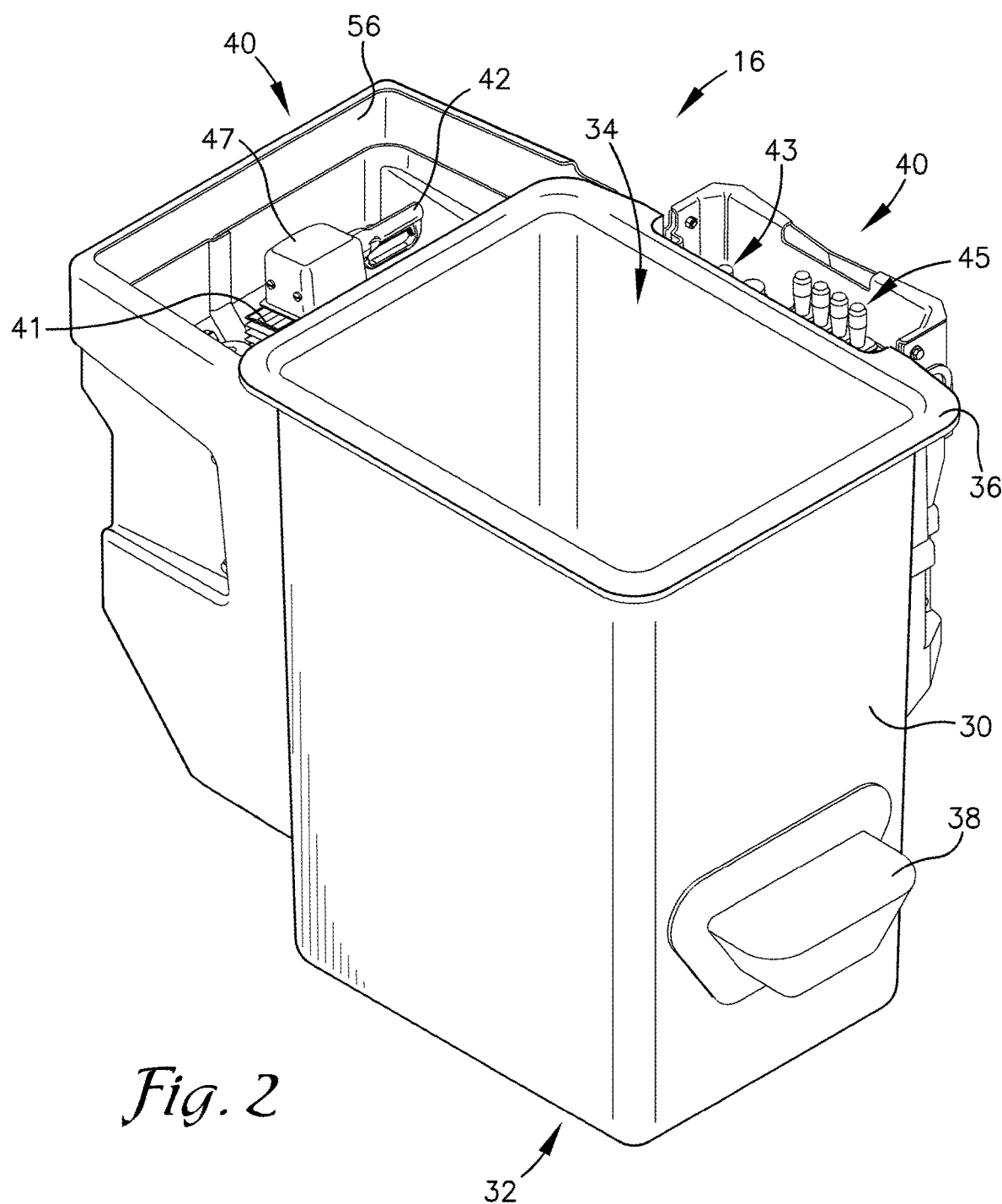
FIG. 2 depicts a perspective view of an embodiment of a utility platform assembly.

The utility platform assembly 16, as best illustrated in FIG. 2, provides an elevated surface from which at least one utility worker can perform a task. Embodiments of the utility platform assembly 16 comprise four bucket sidewalls 30 and a bucket floor 32 that collectively form a cavity 34. The utility platform assembly 16 may also present a bucket lip 36 along a top portion of at least one bucket sidewall 30. The utility platform assembly 16 may further comprise a step 38 and/or a door (not illustrated) in at least one of the bucket sidewalls 30 to allow for ingress and egress of the utility worker. The utility platform assembly 16 may also comprise a handrail (not illustrated).

The four bucket sidewalls 30 and the bucket floor 32 of the utility platform assembly 16 form the cavity 34. The four bucket sidewalls 30 may be unitary, i.e. formed of a single monolithic structure, or they may be coupled together. The transition between successive bucket sidewalls 30, and/or between the bucket sidewalls 30 and the bucket floor 32, may be rounded or arcuate. In some embodiments, the utility platform assembly 16 presents a horizontal cross-section that is substantially rectangular. Thus, two of the opposing bucket sidewalls 30 may have a greater width than the other two opposing bucket sidewalls 30. In other embodiments, the utility platform assembly 16 presents a horizontal cross-section that is substantially square. Other embodiments of the utility platform assembly 16 may be other shapes about the horizontal cross-section, such as an ellipse, a circle, a D-shape, a triangle, a trapezoid, a rhombus, or other quadrilateral. The shape of the cross-section of the bucket may vary along the height of the bucket and the bucket shape may be optimized to perform a given function. The bucket may be designed for one or multiple workers. The workers may be separated by a structure for safety or may be contained within the same cavity 34, as depicted in FIG. 2.

In embodiments of the invention, the utility platform assembly 16 further comprises a set of upper boom controls 40, as best illustrated in FIG. 2. The set of upper boom controls 40 are configured to be manipulated by the operator standing in the utility platform assembly 16 so as to move the utility platform assembly 16 and/or the boom assembly 14 to a desired location and configuration. In embodiments, the set of controls 40 utilize hydraulic power that is supplied in the form of a hydraulic fluid by a set of hydraulic lines (not illustrated).

The set of upper boom controls 40 allows the operator to move the boom assembly 14 from within the utility platform assembly 16. The operator in the bucket has a better vantage point to know where and how to position the boom assembly 14 as opposed to the operator on the ground. Additionally, the set of upper boom controls 40 promotes efficiency by allowing the operator to directly control the movement of the boom assembly 14. In embodiments of the invention, an assistant operator (not illustrated) can access a set of lower boom controls (not illustrated) for the duration of the operator being in the utility platform assembly 16. This provides a safety backup to allow the assistant operator to remove the operator from a dangerous situation should the operator become incapacitated or there be a failure in the set of upper boom controls 40. The set of upper boom controls 40 may utilize the same or a different mechanism from the set of lower boom controls.

The set of upper boom controls 40 comprises a dash cover 41 and at least one input 43, as best illustrated in FIG. 2. In various embodiments of the invention, the input 43 can be a valve handle 45, an insulated joystick assembly 42, a button (not illustrated), a switch (not illustrated), or a combination thereof. The dash cover 41 is generally flat or arcuate and presents at least one opening. Each of the at least one opening is situated around each of the at least one input 43. The dash cover 41 may additionally contain written instructions and safety information.

The dash cover 41 may include a joystick mount 47 that protrudes upward and/or outward from the dash cover 41. The joystick mount 47 allows the insulating joystick assembly 42 to be positioned horizontally relative to the utility platform assembly 16. The horizontal orientation of the insulating joystick assembly 42, as illustrated in FIG. 2, provides a more natural gripping orientation for the user and is less likely to snag on other debris and equipment. The joystick mount 47 may provide a stable platform relative to which at least a portion of the insulating joystick assembly 42 is configured to move such that the user can input desired movement (and other command) information.

The insulating joystick assembly 42 will now be discussed in more detail. The insulating joystick assembly 42 is disposed in the set of upper boom controls 40 (as illustrated in FIG. 2) to control the movement of the utility platform assembly 16 relative to the distal end of the boom assembly 14 and/or the structural base 12. Some input commands may be interpreted as moving the utility platform assembly 16 relative to the boom assembly 14, moving the boom assembly 14 relative to the structural base 12, or both. For example, an instruction to move the utility platform assembly 16 away from the structural base 12 may be interpreted as requiring a lengthening of the boom assembly 14, a lowering of the boom assembly 14 angle relative to the structural base 12, and a raising of the utility platform assembly 16 relative to the boom assembly 14. These three distinct movements in each instructed by a single input into the controller.

In embodiments of the invention, the insulating joystick assembly 42 is a multi-axis controller that receives input from the user about more than one axis. This is different than many prior art systems that include multiple single-axis controllers to produced complex movement. In these prior art systems, the user would have to move their hand from one joystick to another in order to move the utility platform assembly 16 in more than one direction. The multi-axis controller therefore simplifies the insulating joystick assembly 42 into a more compact and intuitive design. The multi-axis controller includes a plurality of motion sensors each configured to detect motion of the insulating joystick assembly 42 relative to the joystick mount 47, the set of upper boom controls 40, or other reference frame.

In embodiments of the invention, the boom assembly 14 and/or the utility platform assembly 16 further comprises a working jib (not illustrated). The working jib is disposed on the distal end 22 of the boom assembly 14. The working jib is configured to lift objects and perform other tasks as desired by the operator. The working jib has a jib arm that is pivotably secured to the boom assembly 14. A load line extends from the jib arm to be lowered so as to be secured to a load or perform other tasks.

An insulating joystick assembly 42 is disposed in a control box 56 attached to at least one bucket side wall 30 of the utility platform assembly 16. The insulating joystick assembly 42 may be used to control the boom assembly 14 and/or any other components of the boom assembly that may not be illustrated in the figures but may be coupled electrically, mechanically, hydraulically, or pneumatically. The joystick may also be used to control features of the structural base 12. Safety features may be employed in the control box 56 or on the insulating joystick assembly 42 that prevent operation of the structural base 12 or the boom assembly 14.

Though mounted on one side, horizontally, as depicted in FIG. 2, the insulating joystick assembly 42, or any other controls making up the set of controls 40, may be mounted on end, vertically or any other side. This may be helpful to people that may be left handed, or may not be able to use one arm or hand. The insulating joystick assembly 42, or any controls making up the set of controls 40, may be able to move up or down to accommodate varying heights of users.

For purposes of this disclosure, a reference system will be defined. The reference system relates to a miniature observer atop the insulating joystick assembly 42 facing toward the joystick mount 47. Note, as discussed above, that in embodiments of the invention, the default position of the insulating joystick assembly 42 is generally horizontal (as shown in FIG. 2). The axes of movement of the insulating joystick assembly 42 are described from the perspective of the miniature observer. Various embodiments of the insulating joystick assembly 42 may move forward and backward (e.g., toward and away from the joystick mount 47), left and right (e.g., laterally horizontally parallel to the joystick mount 47), up and down (e.g., laterally vertically parallel to the joystick mount 47), pitching (e.g., pivoting up and down), yawing (e.g., pivoting left and right), and/or rolling (e.g., pivoting about a central axis). It should be appreciated that this reference system is only exemplary and used to illustrate concepts to the user. In other embodiments of the invention, other reference systems may be used.

Figure 3:
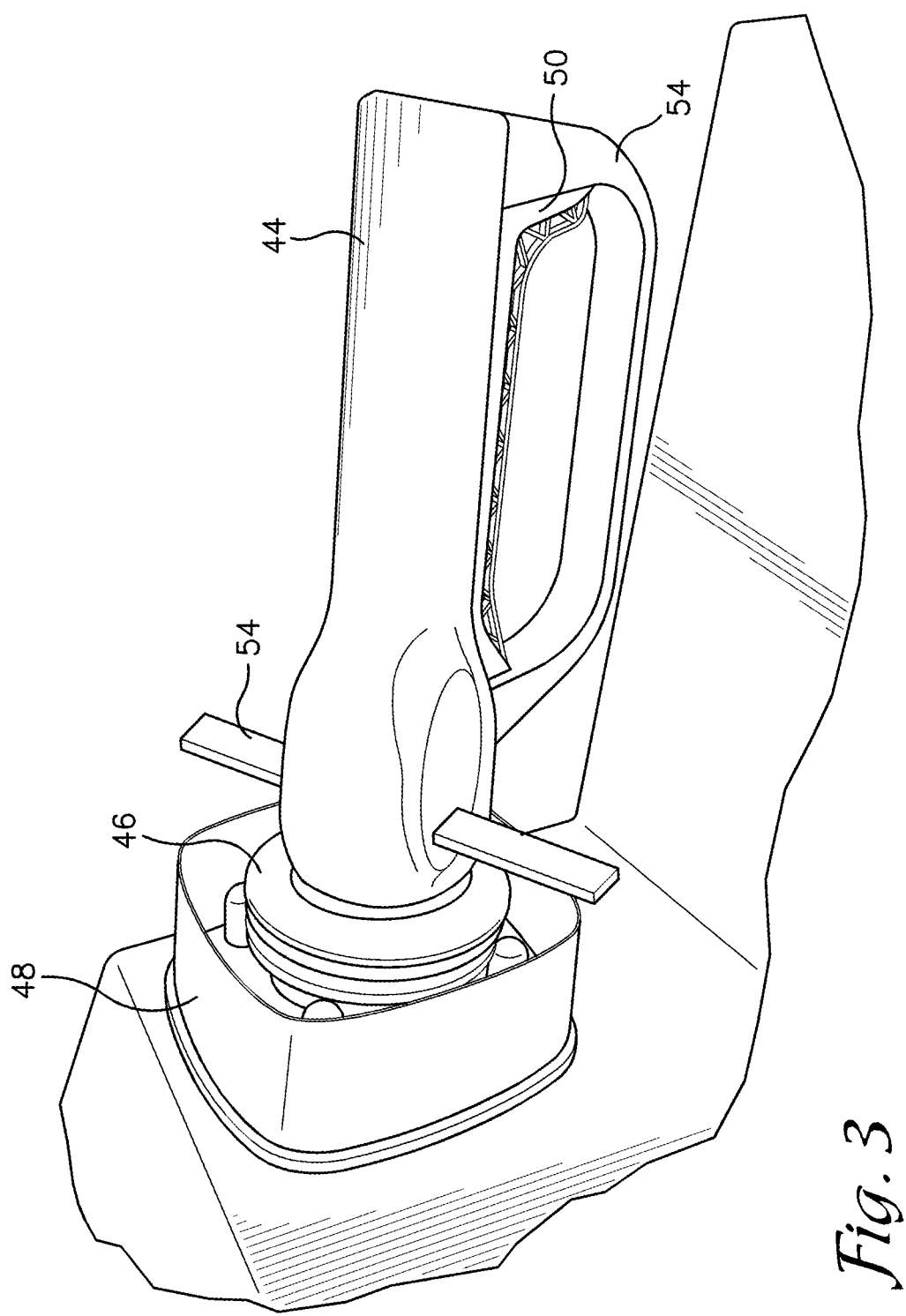
FIG. 3 depicts a perspective view of a first embodiment of an insulating joystick assembly.

FIG. 3 presents an exemplary embodiment of a close-up view of the insulating joystick assembly 42. One skilled in the art should appreciate that the joystick assembly depicted is exemplary only, and may be two or more joysticks working in combination, or may also be any other sort of handle or shape that may be convenient for an operator. The exemplary joystick assembly in FIG. 3 comprises a handle 44, a rod-insulating cover 46, a joystick base 48, and a user input device 50.

In embodiments, the handle 44 may be made of hard or soft material for ease of gripping. A horizontal cross-section of the handle 44 may be round, oval, square, or any shape that may accommodate the user's hand. The handle 44 may taper from one end to the other and may be larger at an end proximal the base than at a distal end or where the handle may be gripped by the user. The handle 44 may be configured ergonomically providing indentions for fingers or may just be smooth. The handle 44 may be rough to provide grip in wet conditions and also may be soft for squeezing. The handle 44 may have or be made of electrically highly-resistant material or non-conductive material such as, porcelain, glass, rubber, non-conductive polymers, silicon, or any other known highly-resistant or non-conductive material. Any of the components of the insulating joystick assembly 42 may comprise the non-conductive or highly-resistant materials listed. Those components may include the rod-insulating cover 46, the joystick base 48, the user input device 50, and the interlocking guard 52. The handle 44 may also be covered by a grip cover. The grip cover may also be any of the fore-mentioned materials or textures applied to the handle 44. Other components not shown in FIG. 3, such as interior components may also be constructed of highly-resistant or non-conductive materials.

The handle 44 may be configured for receiving an electrically insulating cover (not illustrated). The cover may be removable or permanent. The cover may be made of the non-conductive or highly-resistant materials as discussed above. The cover may be configured for the geometry of the handle or may be universal. The cover may be rigid, flexible, or elastic. The cover may fasten about the handle using fasteners such as, buttons, snaps, adhesive, surface area based adhesives, or any general fasteners known in the art.

A user input device 50, in embodiments, is located on the handle 44. In embodiments of the invention the user input device 50 controls an interlocking switch that may be housed in the base. The user input device 50 must be engaged thus activating the interlocking switch for the operator to control the boom assembly 14, or any other mechanical operations. This is a safety feature provided for the operator and ground workers. The handle 44 also comprises an input guard 54. The guard 54 prevents the operator from unintentionally activating the interlocking switch by bumping the user input device 50 and allowing operation of the boom assembly 14. The user input device 50 may also operate any other functionality that may be useful for a boom operator. There may be a plurality of user input device attached to the handle, rod, or base, and one is only exemplary.

The user input device 50 could be used for control of any other type of mechanism such as, a starter for a machine, a power source, causing movement of, but not limited to, an actuator/hydraulic/pneumatic device. There may be a plurality of user input devices on the handle. In embodiments of the invention the user input 50 may include buttons or switches for controlling any of the above stated operations. The user input device 50 may be mechanically linked as illustrated in FIG. 3, but also may be linked electrically by wires or remotely if a sensor and wires and/or receiver and transmitter are contained within the handle 44. The user input device 50 may be located on a rod below the handle or on the base. Alternative locations of the user input device 50 may provide for separation of the user input device 50 from the handle 44 and help prevent the operator from mistakenly engaging the user input device 50.

The user input device 50 may be any of various shapes and sizes depending on location and relative ease of access. For example, when the user input device 50 is on the handle 44 it may be easier to engage when the user input device is a lever as in the embodiment depicted in FIG. 3. Ease may not be a factor. It may be advantageous for it to be difficult for an operator to engage the user input device 50. The user input device 50 may require two hands to press thus making it impossible for the operator to simultaneously operate other controls, or any other machine while engaging the user input device 50. In another embodiment, the user input device 50 may be a switch with a locking mechanism. The locking mechanism may require two hands as a safety feature as described above. The user input device may also be a button, switch, dial, or any other method of user input, control, or a plurality or combination of the described methods.

A rod-insulating cover 46 is depicted in an embodiment in FIG. 3. The rod-insulating cover 46 may be made of a flexible material that is non-conductive or highly-resistant to electricity. The rod-insulating cover 46 may be attached at a distal end to the handle 44 and at a proximal end to the joystick base 48. The rod-insulating cover 46 may be a loose-fitting fabric, plastic, or rubber and may also be shaped in a wave pattern to provide more flexibility.

The handle 44, in this embodiment, may be displaceable or adjustable. This allows for the displacement of the handle 44 to be sensed and a signal generated proportional to the displacement of the handle 44. The embodiment, in this form, may not offer a reduction in parts and simplicity, however all parts may be made of a non-conductive material such as the handle 44, the rod-insulating cover 40, and interior mechanical components such as gears, levers, and pulleys. The non-conductive mechanical components provide the operator with more layers of separation and insulation from the potentially electrically charged components. It should also be noted that any embodiment with the rod-insulating cover 40 may also be rigid. The handle 44 may not move and sensor within the base may sense the force and torque applied to the handle 44 thus reducing the number of parts and the complexity of the insulating joystick assembly 42. The rod may be insulated providing another layer of protection against electric shock.

Continuing with the embodiment in FIG. 3, the joystick base 48 attaches at a distal end to the rod-insulating cover 46 and at a proximal end to the control box 56. The control box 56 may be any stationary structure or stationary or mobile machine. The attachment may be nuts and bolts, adhesive backed fasteners, clips, screws, snaps, magnets, adhesives, or any other fastener typical of the art. The joystick base 48 may be permanently attached to the structure or may be easily removable. The joystick base 48 may only be resting on the structure for ease and quickness of use. The joystick base 48 may comprise electrical wires that extend beyond the joystick base 48 into the structure, or the joystick base 48 may contain transmitters and receivers and a self-contained power system. In this case, electrical wires may or may not extend out of the joystick base 48. The joystick base 48 may have a guard protruding vertically further blocking the rod-insulating cover 46. This may also comprise non-conductive or highly-resistant materials as discussed above. For strength purposes, it may be necessary for the attachments and the bottom of the base to be made of metal. The guard provides a safe barrier blocking an operator from touching the metal conductive components. The components that may be metal may also be coated or covered in non-conductive or highly resistive-materials as discussed above.

FIG. 3 depicts an embodiment of the insulating joystick assembly 42 with an optional safety flange 54. The safety flange 54 is made from a non-conductive or highly-resistant material, such as described above. The safety flange 54 may additionally or alternatively be coated or covered in a non-conductive or highly-resistant material. In FIG. 3 the safety flange 54 is depicted as rectangular shape and protruding in opposing directions. The safety flange 54 may be retractable, foldable, collapsible, permanent or detachable. It should be obvious to one skilled in the art that the safety flange 54 may be many shapes and sizes. The safety flange 54 may be circular wrapping 360 degrees around the handle or square, like a box. The safety flange 54 may be rigid or flexible while still providing enough resistance to prevent an operator from sliding his/her hand far enough down the handle to be in danger of electric shock. The insulating joystick assembly 42 may provide up to 6 degrees of freedom as described in the reference system above.

Figure 4:
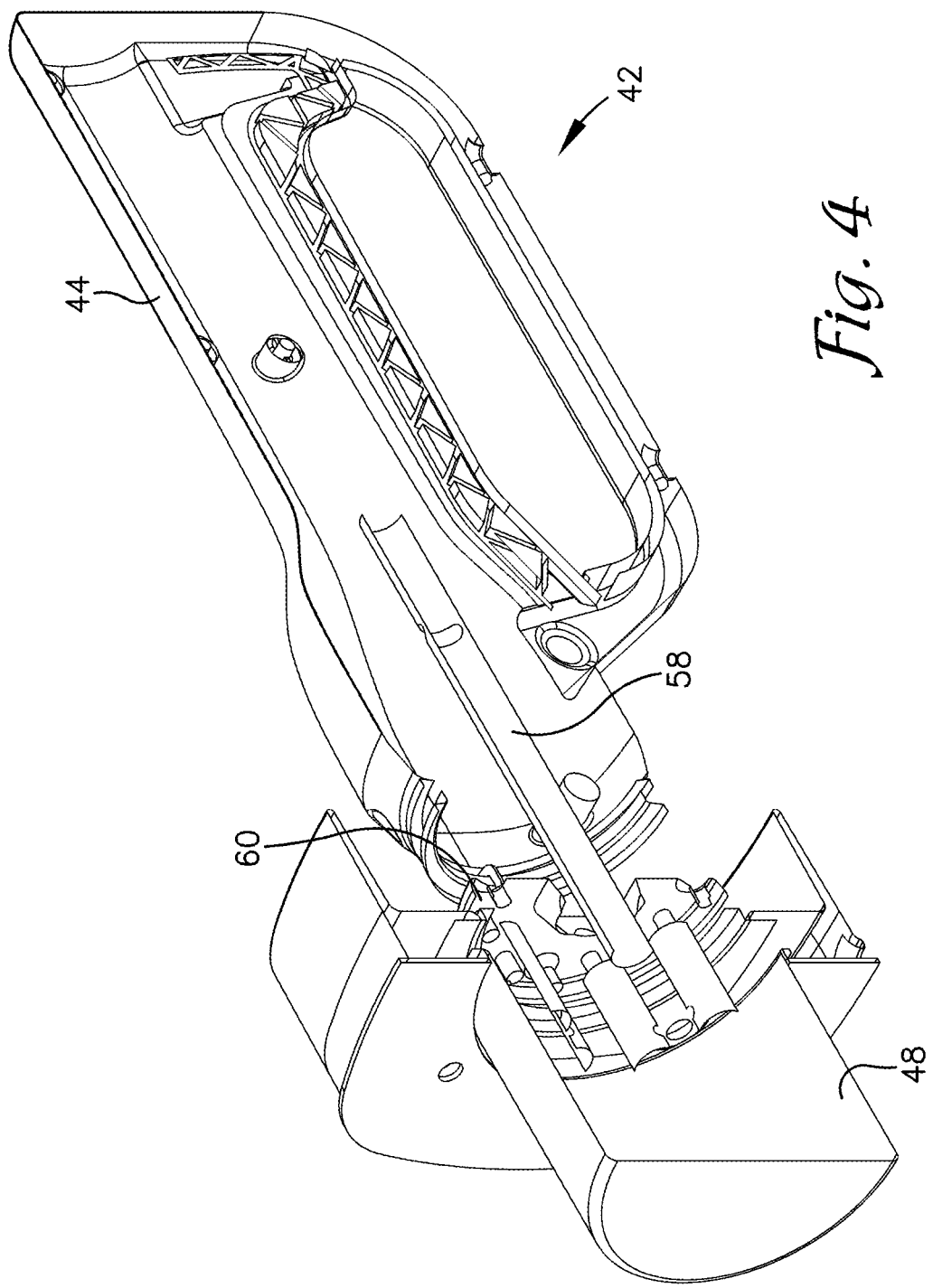
FIG. 4 depicts a perspective view of a cross-section of the first embodiment of the insulating joystick assembly.

FIG. 4 presents an exemplary embodiment of the invention displaying a cross-section of the insulating joystick assembly 42. A cross-section view of the handle 44, the joystick base 48, and the exterior rod 58 is shown. The rod 58 extends from the handle 44 through the rod-insulating cover (not illustrated), into the joystick base 48. The exterior rod 58 may move with the handle 44 motion and provide an interior housing for a push rod (not illustrated). The push rod may be located separate from the exterior rod 58. The push rod may provide actuation of an interlocking switch. The exterior rod 58 may also be attached to the handle 44. In embodiments of the invention the handle 44 is moveable and the displacement of the handle 44 may be sensed by sensors attached to attachment mechanisms 60. As the handle 44 is displaced by a force provided by the operator, the attachment mechanism 60 translates the displacement to a sensor. Once the displacement is sensed, a signal is sent to an actuator to provide motion of the desired boom member. The actuation may be electric, hydraulic, or pneumatic. The signal may be sent through wires or radio waves, and may also control motors, lights, safety on/off switches, emergency switches, vehicle steering controls, or any other combined operation.

Alternatively, the exterior rod 58 may provide a translation of the force imposed by the operator to the handle 44. The handle 44 may not displace relative the joystick base 48. The attachment of the handle 44 and the joystick base 48 may be rigid. Sensors within the joystick base 48 may detect the force translated through the exterior rod 58 sending a signal commanding movement of the commanded boom member. Torque sensors may also be housed in the joystick base 48. This provides degrees of freedom beyond just the two dimensions of displacement. The rotational torque sensor may provide rotation, or translation to a boom member or to steer, or move the structural base 12 forward or reverse. The insulating joystick assembly 42 may have up to 6 degrees of freedom as described by the reference system above. The rotation may also be used to change modes of the boom or structural base 12. The mechanical components such as the exterior rod 58, the handle 44, the attachment mechanisms 60, or any other component of the insulating joystick assembly 42 may be made of, or covered in a non-conductive or highly-resistant material as discussed above.

Figure 5:
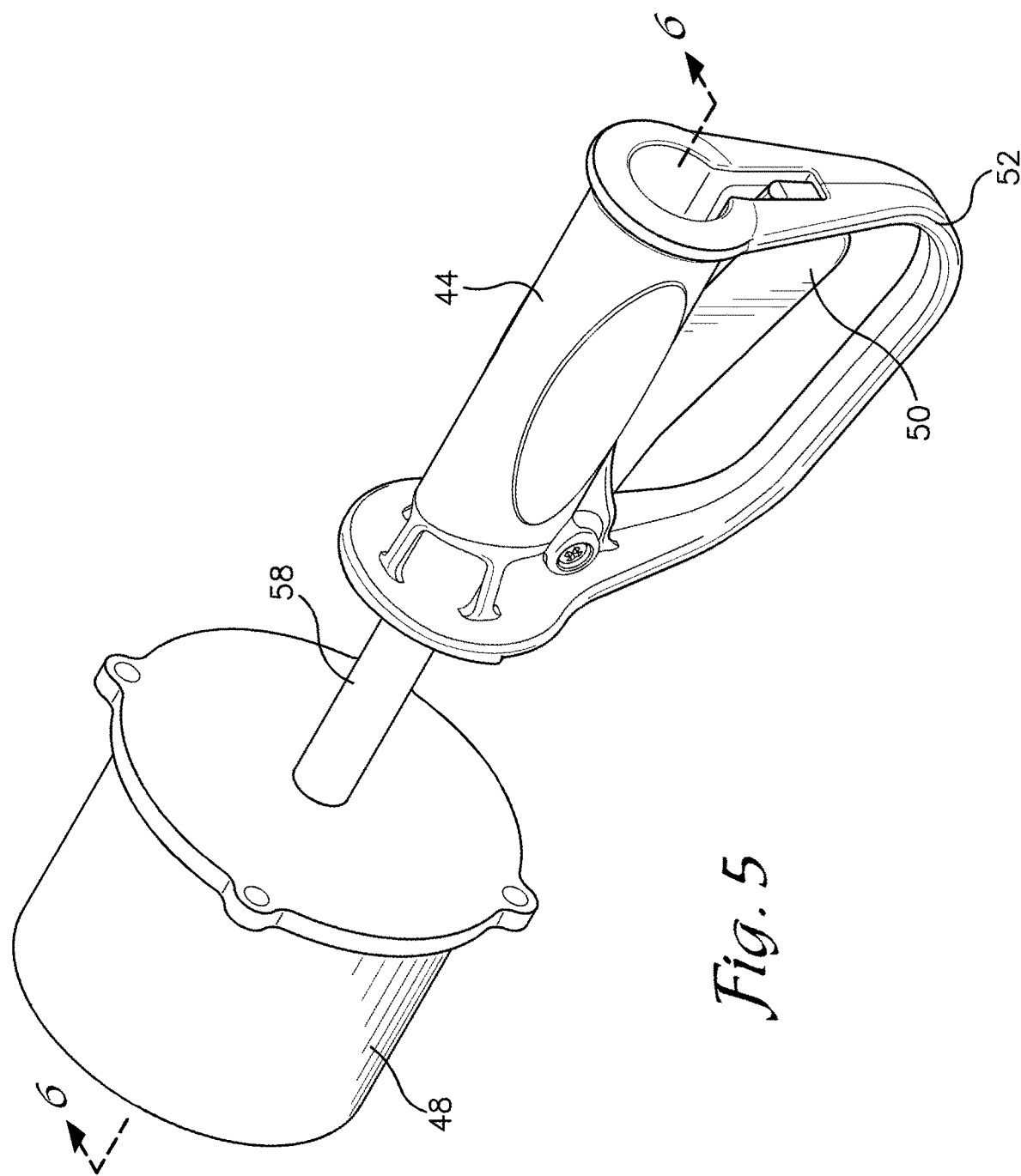
FIG. 5 depicts a perspective of a second embodiment of the joystick assembly.

FIG. 5 depicts another exemplary embodiment of the insulating joystick assembly 42. The handle 44 and exterior rod 58 are immovable. The force imparted by the operator is sensed by translation through the exterior rod 58 to the joystick base 48 as described before. The forces sensors that may be housed within the joystick base 48 may be capable of measuring bending stresses applied to the handle in two axes, torsional stresses in one axis, and axial tensile or compressive forces along a fourth axis. In this way, it is suitable for applications which require multiple-axis controllers. The rod-insulating cover 46 is not necessary since the movement is not needed. The insulating joystick assembly 42 has no moving parts. Since the force is measured by translation from the handle 44 through the rigid exterior rod 58, no moving parts are necessary. Since no moving parts are present, the lifetime of the components is increased and little operational wear and tear occurs. This allows for more accurate measurements over time and reduces the cost of maintenance and part replacement. This also reduces mechanical deadband and provides the operator with immediate feedback.

The user input device 50 may be a lever transferring a user input to a push rod housed within the handle 44. The push rod may activate an interlocking switch that allows controllable access to the boom assembly 14. The user input device 50 and the push rod (not illustrated) may be non-conductive or highly-resistant material.

Though it has been discussed that the sensors are in the joystick base 48, the sensors may also be housed in the handle 44, measuring the pressure applied by the operator. Sensors may also be attached to the rod, such as strain gauges to measure the amount of strain in the exterior rod 58 when force is applied. The strain in the exterior rod 58 may only be measured if the exterior rod 58 is not entirely rigid and the elasticity is known. The joystick base 48 may be rigidly attached to a structure such as the joystick mount 47 at the end distal the rod 58. Wires transmitting the signals may be run through, or on the outside of, the exterior rod 58 and the joystick base 48. There may also be a power source in either the handle 44 or the joystick base 48, and there may be a receiver and transmitter housed in the handle 44 or joystick base 48 for communication with a remote receiver and transmitter. The electronic components may be housed within the handle 44 to free the joystick base 48 from necessary components. This allows the joystick base 48 to be removed without loss of operability.

The joystick base 48 may be interchangeable or a base may not be necessary or may not mount to a particular machine. The joystick base 48 may also be permanent and the rod 48 may attach to the base 48. This may be performed by screwing the rod 58 into the base 48 or any of the previously listed attachment methods. In other embodiments, the joystick mount 47 may be the joystick base 48. Sensor wires may be attached to the rod 58 and terminate in general electrical attachments. The mating attachments may be connected to the joystick base 48 for quick release and ease of connecting the electrical connections between the joystick base 48 and the rod 58.

The lack of movement of the exterior rod 58 and the handle 44 also provide for fewer moving parts. This allows for simplicity and low maintenance costs. The lack of movement also provides for immediate response of the boom assembly 14. There is no deadband or lag time associated with moving mechanical parts. The force sensed and the signal transmission is near immediate, translating into improved performance for and real time response to the operator's inputs.

Figure 6:
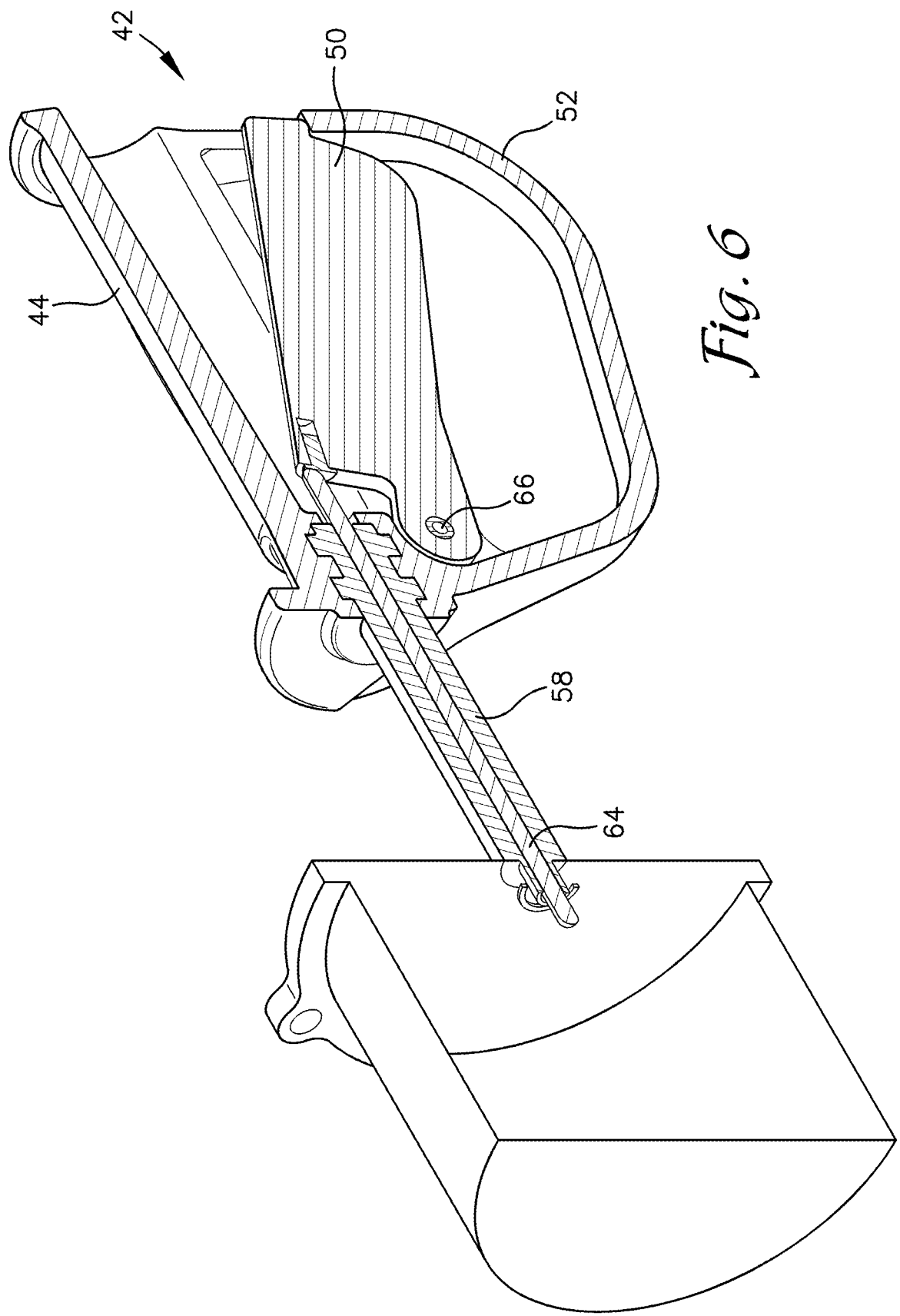
FIG. 6 depicts a perspective view of a cross-section of the second embodiment of the insulating joystick assembly.

FIG. 6 depicts an embodiment of the invention presenting a cross-section of the joystick assembly. The insulating joystick assembly 42 comprises a handle 44, an interlock guard 52, the user input device 50, an exterior rod 58, an interior rod 64, and a joystick base 48. The user input device 50 pivots at joint 66. The interior rod 64 extends from an end interior the handle 44 in contact with the user input device 50, through the exterior rod 58 into the joystick base 48. As the user input device 50 is actuated the interior rod 64 is actuated through the structural base 48 activating an interlocking switch. The activation of the interlocking switch enables the operator to control the boom assembly 14, or any other components as discussed above. The pivot joint 66 may be any joint that allows the user input device 50 to pivot. As the interior rod may be in close proximity to electrical components, the user input device 50, interior rod 64, and exterior rod 44 may comprise any of the non-conductive or highly-resistant materials discussed above.

Figure 7:
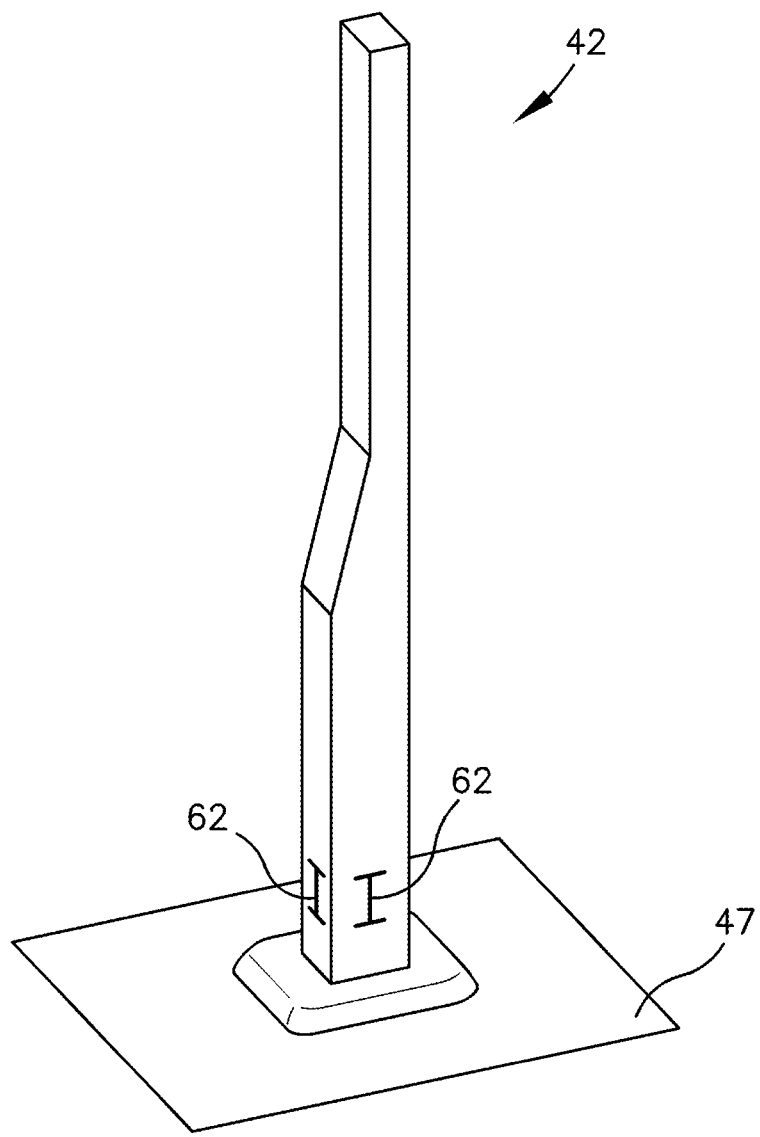
FIG. 7 depicts a perspective view of a third embodiment of the joystick assembly where the handle and the rod are unitary.

FIG. 7 depicts an embodiment of the joystick assembly 40 where the handle and the exterior rod are the same mechanism. The insulating joystick assembly 42 is rigidly mounted to a structure such as the joystick mount 47. The insulating joystick assembly 42 may flex, with known elasticity, with applied force resulting in a small displacement to the end distal the joystick mount 47. The displacement is large enough to provide feedback to the operator. The displacement is sensed by surface sensors 62 on the insulating joystick assembly 42. The sensors 62 may be strain gauges. Since the joystick 40 is rigidly mounted, the base, proximal the structure, does not move. Force is applied by the operator at the distal end which moves proportional to the force applied. This provides a predictable stress, or strain, in the joystick 40 at the location of the sensor 62. The measured force is indicative of the applied force and an indicative signal may be sent from the sensor 62.

The embodiment depicted in FIG. 7 includes fewer components than the embodiments depicted in FIGS. 3-6. The embodiment of FIG. 7 includes a greater separation from electrically energized elements than the embodiments in FIGS. 3-6; with the added benefits of simplicity and cost reduction. The embodiment exemplified in FIG. 7 may also reduce mechanical deadband as there are no force translations between components. The sense and transmission signal is near immediate providing the operator with near real time feedback. The joystick may sense translation displacement forward and back and rotation (yaw), sensing both force and torque in the reference frame described above. The material used for the insulating joystick assembly 42 may be any non-conductive or highly-resistant material described above. The joystick may also be covered in a removable non-conductive sleeve and/or coated with a non-conductive or highly-resistant material. The sensors may be attached to the surface of the insulating joystick assembly 42. The wires carrying the electrical signals measured by the sensors, may run along the surface or be housed inside the insulating joystick assembly 42. The sensors may be easily replaceable and may be any kind of strain measuring sensors.

The insulating components and methods of use provided herein may be used individually or in any combination. The components and methods may also be used with other items and methods such as insulating boom covers. These methods may provide layers of security for operators when used in combination significantly decreasing the potential for injury due to electric shock.

It should be appreciated that, while the above disclosure has been generally directed to the field of aerial devices, embodiments of the invention may be directed to other fields and uses. For example, embodiments of the invention may be used in stationary cranes, antennas, digger derricks, and other equipment that lifts off the ground from a stationary or selectively stationary location.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A joystick assembly, comprising:
   a base;
   a handle comprising a proximal end and a distal end;
   wherein the handle further comprises a user input device for receiving a first user input;
   an interior rod comprising a proximal end and a distal end;
   wherein the proximal end of the interior rod is configured to extend at least partially inside the base and the distal end of the interior rod is configured to contact the user input device;
   wherein the first user input is configured to actuate the user input device;
   wherein actuation of the user input device actuates the interior rod;
   a first sensor configured to sense the actuation of the interior rod;
   wherein the handle is configured to receive a second user input,
   wherein the second user input comprises a force applied to the handle;
   an exterior rod configured to translate the second user input from the handle to the base,
   wherein the base is attached to a utility platform;
   a self-contained power source providing electrical power to the joystick assembly; and
   a second sensor configured to detect the second user input;
   wherein the second sensor is configured to send a signal proportional to the second user input;
   wherein the handle comprises an electrically highly-resistant material on at least one surface.

2. The assembly of claim 1, wherein the electrically highly-resistant material is non-conductive.

3. The assembly of claim 1,
   further comprising an insulating cover attached at a distal end to the handle and a proximal end to the base,
   wherein the insulating cover comprises the electrically highly-resistant material.

4. The assembly of claim 1,
   wherein the handle further comprises a flange near the proximal end for preventing an operators hand from touching the base;
   wherein the flange comprises the electrically highly-resistant material.

5. The assembly of claim 1,
   wherein the handle is covered with a non-conductive material,
   wherein the user input device comprises the electrically highly-resistive material.

6. The assembly of claim 1, wherein a hydraulic boom is actuated in response to the signal sent by the second sensor.

7. The assembly of claim 6,
   wherein the first sensor is an interlocking switch;
   wherein activation of the interlocking switch enables actuation of the hydraulic boom.

8. The assembly of claim 7, wherein the user input device is a lever.

9. The assembly of claim 8, wherein actuation of the lever results in a translation of the interior rod.

10. The assembly of claim 6, wherein the signal sent by the second sensor is indicative of a displacement of the handle.

11. The assembly of claim 6, wherein the signal sent by the second sensor is indicative of a force applied to the handle.

12. The assembly of claim 11, wherein the second sensor is a strain gauge.

13. The assembly of claim 6, wherein the signal sent by the second sensor is indicative of a rotation of the handle, wherein the rotation is about an axis coaxially aligned with the handle to create a yawing movement of the handle.

14. The assembly of claim 1, wherein the exterior rod is configured, at a distal end, to attach to the proximal end of the handle and configured, at a proximal end, to attach to the distal end of the base.

15. The assembly of claim 1,
   wherein the user input device is a lever, and
   wherein actuation of the lever results in a translation of the interior rod.

16. The assembly of claim 15,
   wherein the translation of the interior rod activates an interlocking switch;
   wherein actuation of the interlocking switch allows the second user input to actuate a boom associated with an aerial device.

17. The assembly of claim 16,
   wherein the electrically highly resistant material is a first electrically highly-resistant material, and
   wherein the exterior rod and the interior rod comprise a second electrically highly-resistant material,
   wherein the second electrically highly-resistant material is distinct from the first electrically highly-resistant material.

18. The assembly of claim 17, wherein the highly-resistant material is a polymer.

19. A joystick assembly, comprising:
   a base;
   a handle comprising a proximal end, a distal end, and a user input device for receiving a first user input;
   an interior rod comprising a proximal end and a distal end;

wherein the proximal end of the interior rod is configured to extend at least partially inside the base and the distal end of the interior rod is configured to contact the user input device;
wherein the first user input is configured to actuate the user input device;
wherein the actuation of the user input device actuates the interior rod;
a first sensor for sensing the actuation of the interior rod;
wherein the handle is configured to receive a second user input,
wherein the second user input comprises a force applied to the handle;
wherein the handle is displaced as a result of the force applied to the handle;
an exterior rod configured to translate the displacement of the handle as a displacement of the exterior rod,
wherein the base is attached to a utility platform;
a self-contained power source providing electrical power to the joystick assembly; and
a second sensor configured to detect the displacement of the exterior rod;
wherein the handle comprises an electrically highly-resistant material on at least one surface;
wherein the user input device comprises the electrically highly-resistant material on at least one surface.

20. The assembly of claim 19, wherein the interior rod is attached to the user input device.

* * * * *